April 30, 1957     J. A. DRAXLER     2,790,513
CONTROL CIRCUIT FOR INDUSTRIAL LIFT TRUCKS
Filed July 10, 1956
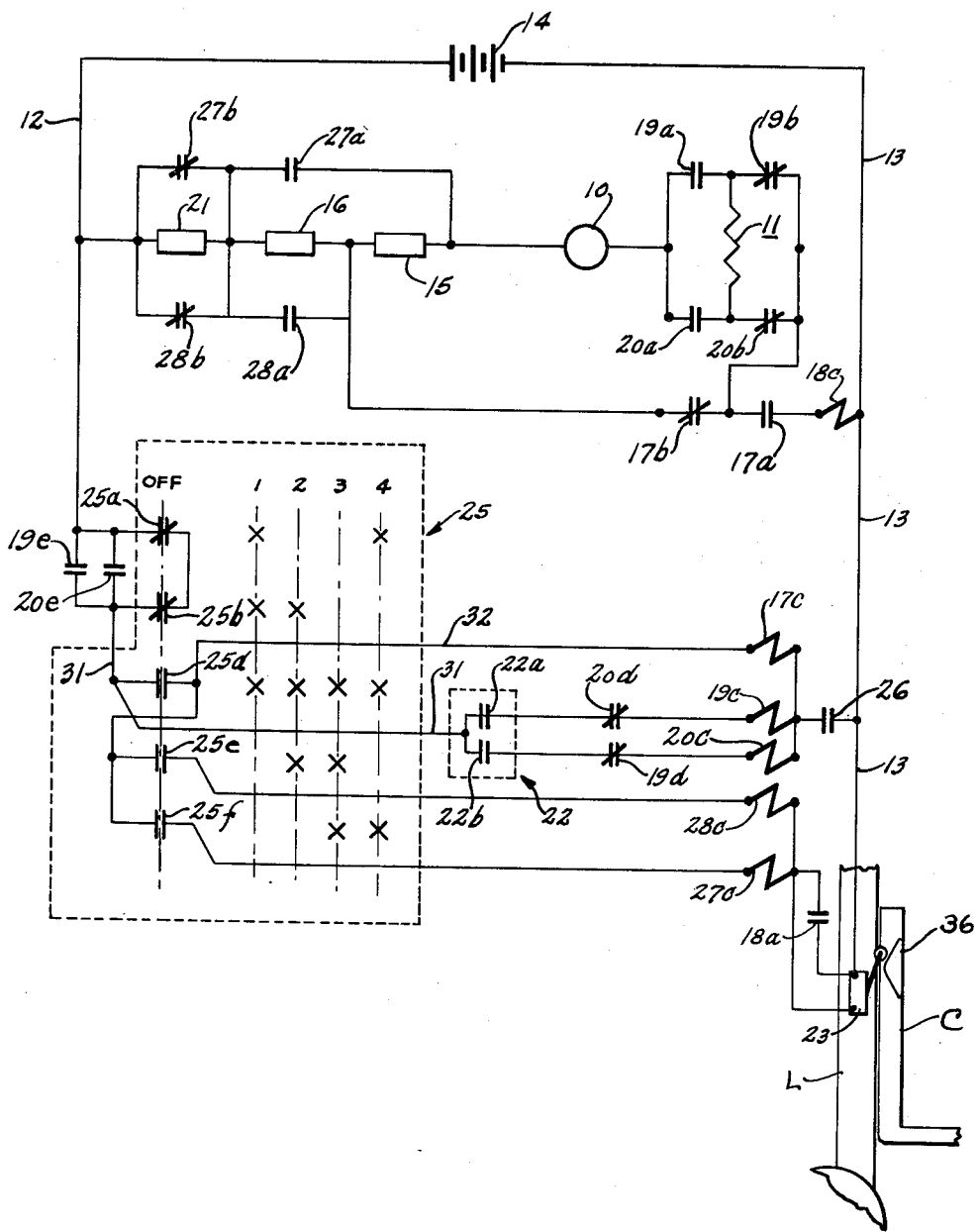
INVENTOR.
JOHN A. DRAXLER
BY
Golrick & Golrick
ATTORNEYS United States Patent Office 2,790,513
Patented Apr. 30, 1957

2,790,513

CONTROL CIRCUIT FOR INDUSTRIAL LIFT TRUCKS

John A. Draxler, Berea, Ohio, assignor to The Elwell Parker Electric Company, Cleveland, Ohio, a corporation of Ohio Application July 10, 1956, Serial No. 596,979

5 Claims. (Cl. 187—9)

The present invention is concerned with a control circuit for an industrial lift truck and more particularly to a control circuit for an electrically driven or powered industrial lift truck embodying vehicle speed limiting means becoming operative when the lift mechanism carries a load above a preselected point.

In the employment of industrial tier lift trucks, safety considerations dictate, for normal vehicle travel from one place to another with a load on the tier lift mechanism of the truck, that the truck be not operated at high traveling speeds with the load on the tier lift carriage mechanism elevated beyond a certain point. This safety concern arises primarily from the fact that, by elevating a load on the tiering carriage and thereby raising the center of gravity of the mass system comprised of the vehicle and load, such system may become relatively unstable, or the vehicle may be less manageable at higher traveling speeds, particularly over rough surfaces or in turning. Thus at times there may be a clear possibility of overturning a fast moving vehicle carrying a load in elevated position, for example with a sharp or sudden turn or upon encountering some obstacle or rough running surface in its path. Further with some tier lift equipment, there is possibility of load shifting or loss under such circumstances, rendered the more dangerous because of load height.

Since good safety practice in industrial establishments demands not only operator education in the use of tools and equipment, but even further that safety control features be built into equipment to insure as far as possible that safe practice and conditions will be achieved independently of the operator, certain industrial tier lift trucks particularly of the electrical types have incorporated a safety switch linked to the tier lift mechanism to be actuated, and thereby automatically set a maximum travel speed, when the tier lift carriage is elevated beyond a certain preselected height deemed a maximum safe load height for the environment, the loads and the possible speed ranges of the field of truck use. Though differing in various systems as to details, such switch has usually been integrated into the motor speed control or power transmission system of the truck drive in such manner as to cut out or prevent the application of the high power or torque required in the driving motor for high vehicle speeds when the load is elevated.

However in some instances, for example, in ascending short ramps into certain operating areas such as trucks or box cars, the geometry of the overall physical situation requires that the load be elevated either for load placement or for travel clearance. With the aforementioned safety limit switch effective, difficulty is encountered in traversing such ramps because of the limitation on torque application imposed by the condition of the safety limit switch.

Hence in some control circuits embodying a limit switch of this character, there has been included in inverse functional parallelism therewith a vehicle level responsive mercury switch set to shunt or by-pass the limit switch or in some other manner remove the speed control function from the same, when the vehicle is longitudinally inclined as in ascending a ramp of grade such that the torque, as otherwise permitted by the safety limit switch, would be insufficient to carry the vehicle over the ramp elevation. Such level responsive mercury switch arrangement has the advantage safetywise of being beyond control of the operator, but has the decided disadvantage of an erratic operation, particularly when the vehicle is traversing an uneven surface.

By another attempt to overcome the problem, a manually operable switch at the control station of the vehicle has been used say in place of such mercury switch to cut out the function of the safety limit switch on the elevator carriage. This expedient for permitting necessary driving torque application, while obviating the difficulties of the mercury switch, has imported the decided disadvantage that the operator could, if he so desired, completely cut out the safety function of the elevator carriage limit switch at any or all times.

Basically the present invention provides in a tier lift truck control system, a safety limit means effective to limit vehicle travel speeds through limitation of torque application when the load is above a certain preselected height, in combination with a power or torque demand responsive means capable of removing automatically the control function from the safety means under those conditions where limited torque application permitted by such limit means would prevent travel even at a safe speed, if at all.

In the specific application to an electrically driven tier lift truck control system hereinafter described, a safety limit switch means, actuated by the tier lift elevator system when the load is raised beyond the preselected point, is effective to limit the torque output of the driving motor, while a relay having its coil in the motor power circuit and its contacts in parallel with the safety limit switch is automatically responsive to the power demand of the motor, as in ascending ramps, to circumvent the limiting function despite transport of an elevated load. Further, the travel control circuit for the motor is such that despite operator carelessness or desire for high travel acceleration, no instantaneous power demand can be made to accelerate the vehicle in such manner or to such degree that the relay device becomes operative at such time as to render the safety insuring function of the circuit ineffective.

The general object of the invention is then to provide in a tier lift truck means whereby travel speeds are automatically limited to a safe range, when the load on the tier lift mechanism is carried beyond a height preselected from safety considerations, while avoiding certain disadvantages attendant upon prior art expedients directed to the same end.

Another object is the provision of a control system for electrically driven tier lift type industrial trucks whereby elevation of a load on the tier lift mechanism beyond a preselected point is effective to limit vehicle travel speeds and yet there is attained automatic accommodation to certain high power or torque demands at low speeds without sacrifice of positive safety limitation on travel speeds.

A more specific object is the provision of a control sytem for an electric motor driven tier lift truck, embodying means for limiting the travel speeds of the truck when the load thereon is elevated beyond a preselected point for the sake of ensuring safe operation; yet permitting, with a load elevated beyond such point, development of driving torque of sufficient magnitude for ascending ramps or overcoming like obstacles at safe speed. Other objects and advantages will appear from the following description and from the drawing.

The drawing represents the present invention as embodied in a power and control sytem for an electrically driven tier lift industrial truck, the system being represented by a simplified or schematic wiring diagram of the electrical system for supplying power to and controlling the manner of power application in an electrical travel driving motor for forward and reverse directions at various speeds or acceleration.

In the drawing there is shown a series vehicle travel drive motor comprised of the armature 10 and field 11, here powered through lines 12, 13 by battery 14 or other suitable electrical power source. Between line 12 and the armature 10 there is connected in series the group of accelerating resistors 15, 16, 21 selectively shunted out of the power circuit—through normally open and normally closed contacts 27a, 27b and normally open and normally closed contacts 28a, 28b actuated to reverse settings respectively by their solenoid coils 27c, 28c in the control circuit hereinafter described—to increase the developed motor torque, hence the vehicle acceleration and speed. The series field is connected in series with the armature to line 13 through normally open contacts 17a of a dynamic brake controlling contactor unit, closed upon energization of the solenoid coil 17c of the unit, and underload relay coil 18c closing the normally open relay contacts 18a upon a certain current demand for purposes to be explained.

However to reverse the polarity of the series field with respect to the armature for purposes of travel direction change or dynamic braking of the vehicle, a solenoid operated forward control contactor unit and similar reverse control contactor unit are provided; the forward control contactor unit having normally open contacts 19a in series between one end of the field 11 and armature 10 and normally closed contacts 19b connected between the same end of the field and the dynamic brake contacts 17a; and the reverse control contactor unit having normally open contacts 20a and normally closed contacts 20b similarly connected but with respect to the other end of the series field. Thus upon energization of the solenoid coil 19c of the forward contactor unit, with the solenoid coil 20c of the reverse contactor unit remaining unenergized, 19a and 19b are respectively closed and opened 20a and 20b are in their respective normal open and closed conditions and the field is series connected with the armature in one polarity relation; whereas upon energization of solenoid coil 20c of the reverse contactor unit, with 19c unenergized, the opposite conditions of these several contacts is attained to give the opposite polarity of field with respect to armature.

In the power circuit provision is made for dynamic braking of the vehicle in addition to the friction type braking usually present by a line or branch, including the normally closed contacts 17b of the dynamic braking contactor unit, connecting a point between resistances 15 and 16 and a point of common connection of contacts 19b and 20b with the normally open brake contacts 17a. Thus with 17a and 17b in normally open and closed condition respectively in consequence of nonenergization of their operating solenoid 17c, the resistance 15 is connected across the effective motor terminals as a load for the motor in its generator action under braking conditions as hereinafter explained. The contacts 17a of course are the main power switch for the motor.

The control circuit includes as manually or mechanically operated control elements, a travel direction or reversing master switch 22 of known form having forward and reverse switches 22a, 22b, selectively closed, for example, by setting a control handle to one or another extreme position; a safety limit switch 23, which may be of any of several known types suitably linked to the tier lift mechanism of the truck in such fashion as to be in closed condition when the elevator carriage C is below a predetermined point, to open when the carriage is above such point and to remain open until the load is returned below that point; a manually set travel accelerating master control unit 25 comprised of a plurality of normally closed switches 25a, 25b and normally open switches 25d, 25e, 25f; and if desired a key lock switch 26 for the vehicle. Hereafter in describing the control circuit proper, for simplicity of description the optional lock switch 26—per se no part of the invention—will be considered a closed connection to line 13.

The operating handles for the reversing master switch 22, accelerator master control 25 and lock 26 are of course located at the operator's station of the truck. Safety limit switch 23 may for example be located on the upright frame members of the truck and have an actuating lever or the like engageable by an element on the elevator carriage or some other element movable simultaneously with the carriage, to close the switch when the carriage rises past the point preselected for bringing travel speed limitation into play, and on return of the carriage below such point to open or permit the opening of this switch.

The travel accelerating controller unit 25 for the circuit herein described has five settings or conditions, indicated as "off," and successive thereto as positions 1, 2, 3, 4—corresponding to increasing acceleration. The switch elements in the drawing circuit are shown for the "off" position of the unit, and in the vertical columns 1, 2, 3, 4 the condition of each switch element for the correspondingly numbered accelerator unit position is symbolically indicated as closed or open by the use or lack of an "X" respectively on a horizontal line with the switch element.

In the forward direction control branch of the control circuit, one side of the forward solenoid 19c is connected to line 13 with the other side connected through normally closed contacts 20d, which are opened by the reverse solenoid coil 20c, to one side of forward switch 22a, the other side of the latter being connected to line 31. In the reverse direction control branch, the reverse solenoid 20c, normally closed contacts 19d opened by forward solenoid 19c, and reverse contacts 22b are similarly arranged between lines 13 and 31.

Between lines 12 and 31 the normally closed switch elements or contacts 25a, 25b of the accelerator control unit are connected in series; and likewise the normally open contacts 19e, 20e, also operated respectively by the solenoids 19c and 20c as parts of the forward and reverse contactor units, are each connected between lines 12 and 31. The control branch for the motor power switch 17a in the brake contactor unit, alternately the dynamic braking control branch, includes the brake contactor solenoid coil 17c with one side connected to line 13 and other side connected to line 31 by a line 32 including the normally open contacts 25d of unit 25.

Two higher motor torque or acceleration control branches of the circuit are provided which are commonly connected at one end to line 13 by the safety limit switch 23 or the normally open contacts 18a of the aforementioned underload relay in parallel with the limit switch. The solenoid coil 28c in series with normally open switch element 25e, and similar solenoid coil 27c in series with normally open switch elements 25f, are thus parallel branches between line 32 and the relay contacts 18a and switch 23.

Considering operation of the circuits for forward travel, when switch 22 is set for forward position, 22a is closed and 22b open, and with accelerator controller 25 at "off," 25a and 25b are normally closed, and 20d is normally closed. Thus current flows in the forward direction control branch energizing solenoid 19c to cause the several contacts thereof 19a, b, d, e simultaneously to change from normal to opposite conditions. Hence 19a closes and 19b opens thereby connecting the field to armature in polarity for forward drive, since 20a and 20b remain in their normal open and closed positions; 19e closes, so that 19c will remain energized despite opening of 25a or 25b, and 19d opens.

Were switch 22 set to close 22b, analogously solenoid 20c would be energized to close 20a, open 20b, open 20d and close 20e for keeping 20c energized, with 19a and 19b remaining in normally open and closed positions, so that the only functional difference in the forward or settings at this point of consideration would be the reversal of field armature polarity. In any event whether 22 is set for forward or reverse travel, with accelerator unit 25 at off position, 25d is normally open so that the brake contactor unit solenoid 17c is unenergized, leaving motor switch 17a normally open and 17b normally closed, so that no power is supplied to the motor, but resistor 15 is shorting the now connected field and armature as a load for possible braking. The conditions arising from various accelerator settings will therefore be described only for forward travel setting of switch 22, since the control circuit functions are identical except as above noted.

If the controller 25 is now set at position 1, the switch 25d therein closes, energizing solenoid coil 17c to open 17b and close 17a, the latter completing the power circuit through field, armature and resistances 15, 16, since 27a, 28a are in normally open positions and 27b, 28b in normally closed positions for shunting out resistance 21, with solenoids 27c, 28c unenergized, due to 25e, 25f being still open. Low torque and low speed is thus available.

It will be noted therefore that the control circuit conditions for travel cannot be affected by the conditions of safety limit switch 23 or relay contacts 18a.

Assuming either 23 or 18a closed, with controller 25 now moved to position 2, although 25a opens, with 19e being kept closed by its self-holding function and 25d closed also at position 2, the solenoid 17c and solenoid 19c are kept continuously energized to maintain the motor switch 17a closed and the previous field polarity; and with 25e now closed solenoid 28c is energized to close its normally open contacts 28a and open its normally closed contacts 28b. Hence with 27a and 27b remaining in their normally open and closed position, in consequence of 25f being yet open and solenoid 27c deenergized, resistances 16 and 21 are now shunted leaving only 15 in the power circuit, giving higher torque, acceleration or speed. Upon movement of controller 25 to position 3 or 4, in like manner, although 25a and 25b or 25b alone may be open, 19e is closed and so also 25d, so that 17c and 19c are energized to keep closed the normally open motor power switch contacts 17a of the brake contactor and to maintain the field polarity connections. At position 3, however, both 25e and 25f are closed, for energization therefore of solenoid 27c as well as 28c, so that 27a now closes and 27b opens, shunting out resistance 15 as well as 16, but leaving resistance 21 unshunted in series with the motor, giving still higher torque or potential speed as resistance 21 is of smaller value than 15. Upon progression of setting in controller 25 to the final position 4, switch 25e now opens again with 25f remaining closed, so that 28c is again deenergized opening 28a and closing 28b, now shunting out resistance 21 while 27c is energized as at position 3, so that none of the resistances are left in series with the motor and highest torque is available.

If, say during forward travel, the controller 25 is set to "off" position, the solenoid 17c is deenergized, allowing motor switch 17a to open and braking switch 17b to close, cutting off power to motor and shunting the motor by resistance 15; and upon throwing direction control 22 to reverse, closing 22b to energize 20c, the polarity control contacts are changed to opposite or reverse setting so that dynamic braking becomes effective. It may be here incidentally noted that, should the forward control contactor unit stick after deenergization of 19c, thereby permitting its jointly moved contacts to remain in non-normal positions, the closing of 22b upon reversal of unit 22 is ineffective to energize 20c and move contacts 20a, 20b from normal positions, since normally closed 19d in the reverse control branch is still open. Hence it is impossible for current to by-pass the field to damage the motor under any conditions.

Considering now the operations of safety limit switch 23 and of relay coil 18c with its contacts 18a, as above noted for controller position 1, operation of the lowest torque or speed setting is unaffected by 18a or 23, since the latter are located only in the current path required for operation of the higher speed control branches controlled by 25e and 25f. If the load elevator carriage C is at a position on the elevator frame upright L below that at which 23 is opened, i. e. below the preselected level at which high travel speeds are to be cut out, the above described progression of speeds may be attained, and the operation of relay contacts 18a is immaterial. However, when 23 is open by virtue of the elevator carriage being above such level, as long as 18a is open, neither 27c nor 28c may be energized for higher torque or speeds irrespective of accelerator control setting. When a ramp or like obstacle is encountered, although the load carriage is elevated to a height whereby 23 is open, the attendant high power or torque demand, that is, high current flow through coil 18c reaches a value where the energization of coil 18c is sufficient to close the relay contacts 18a, permitting energization of either 27c or 28c, or both, so that with controller 25 set at positions 2, 3 or 4 higher torque may be achieved to overcome the ramp slope.

The relay comprised of 18a, 18c may be of course either selected for the power demand point at which it will close, or adjustable to the desired point, several relay types of such characteristics being known. Various actuating arrangements of switch 23 may be used depending upon tier lift mechanism structure and the particular switch type. Thus a normally open switch may be used having a roller lever, or other actuating element in the path of a cam bar 36 on the load carriage, the switch actuating element being positioned to be contacted by bar 36 and moved, thereby opening switch 23, when the carriage rises to the aforementioned preselected height, and to be maintained at open position by the bar as the carriage rises higher. Alternatively, for example, a switch set to successively alternating open and closed positions by successive pressures on an actuating member may be used in conjunction with a cam element depressing the actuating member to open the switch on upward passage of the safe height point, and close the same on downward return, as shown in the drawings.

The closing point of relay 18a, c is selected so that 18c will remain open from zero current to near the maximum current permitted by the energy source voltage and the total power circuit resistance including 15, 16 and the field and armature under near stalled i. e. impeded vehicle conditions. Thus, with conditions prevailing as for controller position 1 setting because of open condition of switch 23 despite an actual position 2, 3 or 4 setting, the current or power demand can close 18a to render the higher torque setting operative. On the other hand, where 23 is closed with carriage at safe level, the closing of 18a is of course immaterial. Since the vehicle in travel does not constitute a frictionless system, the limitation of applied torque to that of controller position 1 conditions therefore imposes a limit on the travel speed attainable from the drive motor over a level path.

I claim:

1. In a tier lift type industrial truck, having a tier lift load elevating carriage mechanism, a vehicular drive motor, a vehicle acceleration control system operative through control of the driving torque derived by the vehicle from said motor, and torque limiting safety control means operative by the said load elevating carriage mechanism while the carriage thereof is above a preselected height to influence the said acceleration control system automatically to limit within a low travel speed torque range independently of the operator the accelerating torque derived by the vehicle, that improvement comprising: the combination, with said torque limiting safety control means, of torque demand responsive means operative to cut out said torque limiting control means at high torque demand attendant upon the vehicle encountering a ramp or like obstacle, whereby the vehicle acceleration control system is operable to permit derivation of high vehicle driving torque irrespective of load carriage height.

2. In a tier lift type industrial truck having a tier lift load elevating carriage mechanism, a vehicular drive motor, an operator manipulated vehicle acceleration control system operative through control of the energy source supplying said motor, thereby controlling the torque developed by the motor, said system including a high acceleration—high torque control means and a low acceleration—low torque control means operable independently of the high torque control means, and torque limiting safety control means operative by the said load elevating carriage mechanism while the carriage thereof is above a preselected height and influencing the said acceleration control system automatically to limit vehicle accelerating torque of the motor within a low travel speed range independently of the operator, that improvement comprising: the combination, with said torque limiting safety control means, of torque demand responsive means operative to cut out said torque limiting safety control means at high torque demand attendant upon the vehicle encountering a ramp or like obstacle, whereby the high torque control means is operable to permit application of high torque irrespective of load carriage height.

3. In a tier lift type industrial truck having a tier lift load elevating carriage mechanism, an electric vehicular drive motor, an operator manipulated vehicle acceleration control system operative through control of the electrical energy supplied from an electrical power source to said motor thereby controlling the drive torque developed by the motor, torque limiting safety control means actuated by the said load elevating carriage mechanism automatically influencing operation of said acceleration control system to prevent operation of said motor at high torque output conditions while the load elevating carriage is above a preselected height, that improvement comprising: the combination, with said torque limiting safety control means, of solenoidally operated torque demand responsive means operative to cut out said torque limiting control means at high torque demand and having the solenoid coil thereof in the power line from said source to said motor, said responsive means being preset to respond to a current through the coil thereof corresponding to a preselected torque output of the motor under at least near-stalled condition of the truck.

4. In a tier lift type industrial truck having a tier lift load elevating carriage mechanism, an electric vehicular drive motor, a vehicle acceleration control system operative through control of the electrical energy supplied in a motor power circuit to said motor thereby controlling the drive torque developed by the motor, said system including a low range torque control circuit branch and at least one higher range torque control circuit branch successive and cumulative in operation to the low range branch, operation of said branches being selected by an operator-set controller, and safety limit switch means actuated by the said load elevating carriage mechanism automatically to limit the operation of said acceleration control system preventing operation of said motor at high torque output conditions and permitting motor operation only at low torque output conditions while the load elevating carriage is above a preselected height, that improvement comprising: the combination of said torque safety limit switch means incorporated in said higher range circuit branch, with solenoidally operated torque demand responsive means operative to circumvent said safety limit switch means at high torque demand and having the solenoid coil thereof in the power circuit to said motor, said responsive means being preset to respond to a current through the coil thereof corresponding to a preselected maximum torque of the motor under at least near-stalled condition of the truck.

5. In a tier lift type industrial truck having a tier lift load elevating carriage mechanism, an electric vehicular drive motor, and a power circuit therefor including elements for varying electrical power applied to said motor thereby controlling the drive torque developed by the motor, a vehicle acceleration electrical control system comprising: a low range and at least one higher range torque control circuit branch selectively controlling said elements in the power circuit, a switching type accelerating controller manipulable by the vehicle operator having switch elements incorporated in said branches, whereby the higher range circuit branch is successive and cumulative in operation to the low range circuit branch in obtaining a high range acceleration, safety limit switch means adapted to be opened or closed by the tier lift mechanism of the truck when the load carriage thereof is above or below a preselected height, said limit switch means being incorporated in the higher range circuit branch to render the same inoperative when opened and thereby limit the vehicle accelerating torque obtainable from the motor, and normally open solenoidally operated switch means having the switch thereof in parallel with the said safety limit switch means and having the solenoid coil thereof series connected in the power circuit, said solenoidally operated switch means being preset to close at a power circuit current corresponding to a preselected maximum torque output of the motor obtainable in the low torque range under near-stalled condition of the truck, whereby the safety limit switch means is circumvented to permit operation of the higher range torque control branch.

No references cited.